United States Patent
Bode

(10) Patent No.: US 6,577,914 B1
(45) Date of Patent: Jun. 10, 2003

(54) METHOD AND APPARATUS FOR DYNAMIC MODEL BUILDING BASED ON MACHINE DISTURBANCES FOR RUN-TO-RUN CONTROL OF SEMICONDUCTOR DEVICES

(75) Inventor: Christopher A. Bode, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 0 days.

(21) Appl. No.: 09/371,191

(22) Filed: Aug. 10, 1999

(51) Int. Cl.$^7$ .............................................. G06F 19/00
(52) U.S. Cl. .......................................... 700/121; 700/32
(58) Field of Search ............................ 700/121, 32, 34, 700/119, 120, 202, 204; 702/130

(56) References Cited

U.S. PATENT DOCUMENTS

| | | | | |
|---|---|---|---|---|
| 4,634,110 A | * | 1/1987 | Julich et al. ................... 714/11 |
| 5,444,637 A | * | 8/1995 | Smesny et al. .............. 702/127 |
| 5,486,998 A | * | 1/1996 | Corso .......................... 700/32 |
| 5,528,510 A | * | 6/1996 | Kraft ............................ 716/19 |
| 5,793,201 A | * | 8/1998 | Nelle et al. ............. 324/207.14 |
| 5,843,527 A | * | 12/1998 | Sanada ........................ 427/240 |
| 6,061,605 A | * | 5/2000 | Davis .......................... 700/121 |
| 6,102,960 A | * | 8/2000 | Berman et al. ................ 703/17 |
| 6,152,818 A | * | 11/2000 | Jacob et al. ................... 454/61 |
| 6,179,938 B1 | * | 1/2001 | Mannhart et al. .............. 156/64 |
| 6,230,080 B1 | * | 5/2001 | Lee et al. .................... 700/275 |
| 6,256,550 B1 | * | 7/2001 | Wu et al. .................... 700/121 |

* cited by examiner

*Primary Examiner*—Leo Picard
*Assistant Examiner*—Chad Rapp
(74) *Attorney, Agent, or Firm*—Williams, Morgan & Amerson, P.C.

(57) ABSTRACT

The present invention provides a method and apparatus for correction of machine disturbances for run-to-run control of semiconductor device manufacturing processes. At least one external variable is identified. How the external variable impacts a semiconductor device manufacturing process is determined. A determination whether the impact of the external variable causes an appreciable impact on the semiconductor device manufacturing process is made. At least one control parameter of the semiconductor device manufacturing process is adjusted in response to the determination that the impact of the external variable causes an appreciable impact on the semiconductor device manufacturing process.

29 Claims, 6 Drawing Sheets

METHOD AND APPARATUS FOR DYNAMIC MODEL BUILDING BASED ON MACHINE DISTURBANCES FOR RUN-TO-RUN CONTROL OF SEMICONDUCTOR DEVICES

BACKGROUND OF THE INVENTION

1. Field of the Invention

This invention relates generally to semiconductor products manufacturing, and, more particularly, to a method and apparatus for compensation of process control in response to machine disturbances for run-to-run control of semiconductor manufacturing processes.

2. Description of the Related Art

The technology explosion in the manufacturing industry has resulted in many new and innovative manufacturing processes. Today's manufacturing processes, particularly semiconductor manufacturing processes, call for a large number of important steps. These process steps are usually vital, and, therefore, require a number of inputs that are generally fine-tuned to maintain proper manufacturing control.

The manufacture of semiconductor devices requires a number of discrete process steps to create a packaged semiconductor device from raw semiconductor material. The various processes, from the initial growth of the semiconductor material, the slicing of the semiconductor crystal into individual wafers, the fabrication stages (etching, doping, ion implanting, or the like), to the packaging and final testing of the completed device, are so different from one another and specialized that the processes may be performed in different manufacturing locations that contain different control schemes.

Among the factors that affect semiconductor processing are machine disturbances. Machine disturbances include external factors such as temperature, humidity, and idle time between processes. One area of semiconductor manufacturing that is affected by machine disturbances is overlay process. One of the most important aspects of semiconductor manufacturing is overlay control. Overlay is one of several important steps in the photolithography area of semiconductor manufacturing. Overlay control involves measuring the misalignment between two successive patterned layers on the surface of a semiconductor device. Generally, minimization of misalignment errors is important to ensure that the multiple layers of the semiconductor devices are connected and functional. As technology facilitates smaller critical dimensions for semiconductor devices, the need for the reduction of misalignment errors increases dramatically.

Generally, photolithography engineers currently analyze the overlay errors a few times a month. The results from the analysis of the overlay errors are used to manually make updates to exposure tool settings. Some of the problems associated with the current methods include the fact that the exposure tool settings are only updated a few times a month. Currently the exposure tool updates are performed manually. Machine disturbances can also change the effectiveness of control settings.

Generally, a set of processing steps is performed on a lot of wafers on a semiconductor manufacturing tool called an exposure tool or a stepper. The manufacturing tool communicates with a manufacturing framework or a network of processing modules. The manufacturing tool is generally connected to an equipment interface. The equipment interface is connected to a machine interface to which the stepper is connected, thereby facilitating communications between the stepper and the manufacturing framework. The machine interface can generally be part, of an advanced process control (APC) system. The APC system initiates a control script, which can be a software program that automatically retrieves the data needed to execute a manufacturing process. The input parameters that control the manufacturing process are revised periodically in a manual fashion. As the need for higher precision manufacturing processes are required, improved methods are needed to revise input parameters that control manufacturing processes in a more automated and timely manner. Furthermore, efficient compensation for machine disturbances is needed.

The present invention is directed to overcoming, or at least reducing the effects of, one or more of the problems set forth above.

SUMMARY OF THE INVENTION

In one aspect of the present invention, a method is provided for correction of machine disturbances for run-to-run control of semiconductor device manufacturing processes. At least one external variable is identified. How the external variable impacts a semiconductor device manufacturing process is determined. A determination whether the impact of the external variable causes an appreciable impact on the semiconductor device manufacturing process is made. At least one control parameter of the semiconductor device manufacturing process is adjusted in response to the determination that the impact of the external variable causes an appreciable impact on the semiconductor device manufacturing process.

In another aspect of the present invention, an apparatus is provided for correction of machine disturbances for run-to-run control of semiconductor device manufacturing processes. The apparatus of the present invention comprises means for identifying at least one external variable, means for determining how said external variable impacts a semiconductor device manufacturing process, means for determining whether the impact of the external variable causes an appreciable impact on the semiconductor device manufacturing process, and means for adjusting at least one control parameter of the semiconductor device manufacturing process in response to the determination that the impact of the external variable causes an appreciable impact on the semiconductor device manufacturing process.

BRIEF DESCRIPTION OF THE DRAWINGS

The invention may be understood by reference to the following description taken in conjunction with the accompanying drawings, in which like reference numerals identify like elements, and in which.

Figure 1:
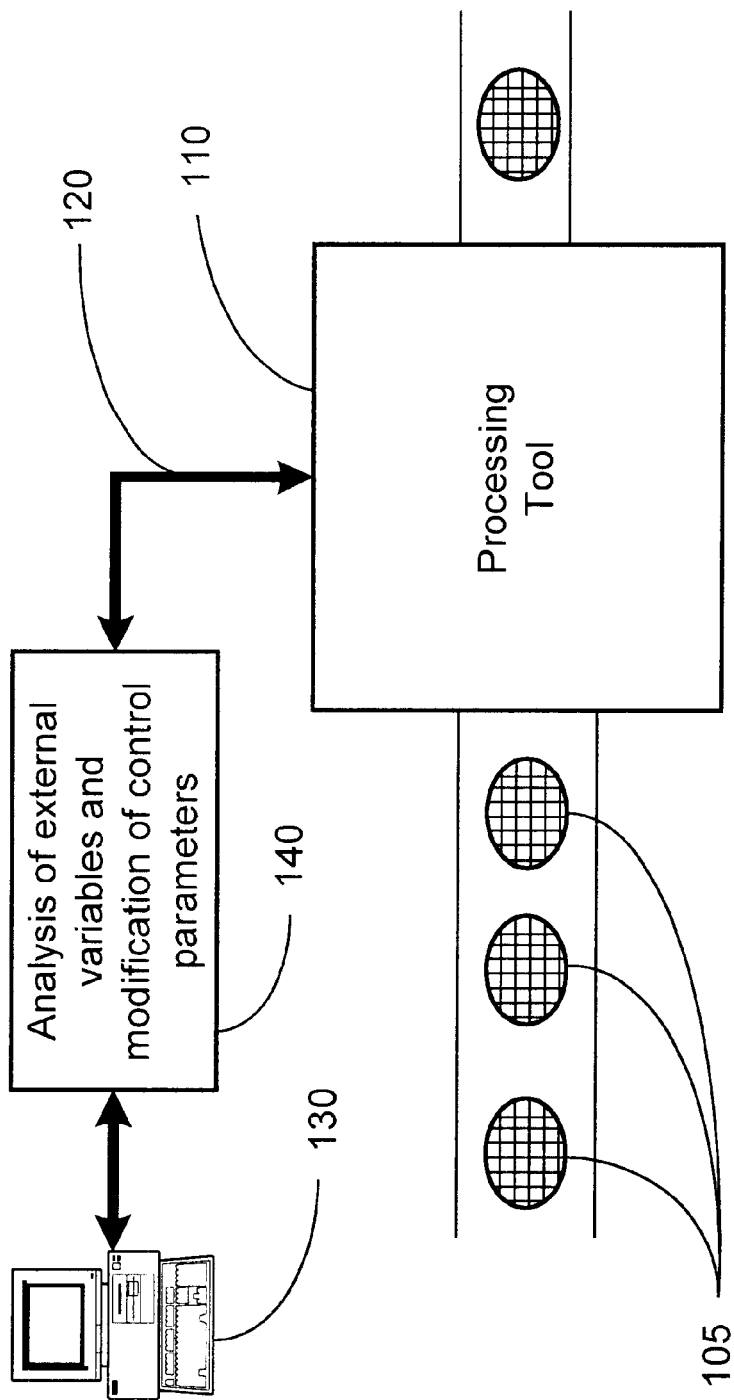
FIG. 1 illustrates one embodiment of the method taught by the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will, of course, be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

There are many discrete processes that are involved in semiconductor manufacturing. Many times, semiconductor devices are stepped through multiple manufacturing process tools. External variables, such as temperature, pressure, and delays between processes, can cause unanticipated variations in semiconductor devices being processed. One semiconductor process that is affected by external variables is photolithography overlay process. Overlay process is an important step in semiconductor manufacturing. In particular, overlay process involves measuring misalignment errors between semiconductor layers during manufacturing processes. Improvements in the overlay process could result in substantial enhancements, in terms of quality and efficiency, in semiconductor manufacturing processes. The present invention provides a method of implementing automated error correction for control of overlay error. Furthermore, the present invention provides a method of adjusting control parameters on a run-to-run basis, in response to external variables that affect processing of semiconductor devices.

Semiconductor devices are processed in a manufacturing environment using a number of input control parameters. Turning now to FIG. 1, in one embodiment, semiconductor products 105, such as semiconductor wafers, are processed on a processing tool 110, such as an exposure tool, using a plurality of control input signals (or control parameters) on a line 120. In one embodiment, the control input signals on the line 120 are sent to the processing tool 110 from a computer system 130. In one embodiment, the control input signals on the line 120 can be integrated into a manufacturing model that controls a manufacturing process. One example of a processing tool 110 used in semiconductor manufacturing processes is a stepper. The control input signals on the line 120 can be modified to reduce the effects of external variables on the semiconductor devices being processed, as described in block 140 of FIG. 1.

In the context of a manufacturing process such as a stepper process, the control inputs on the line 120 that are used to operate the processing tool 110 include an x-translation signal, a y-translation signal, an x-expansion wafer scale signal, a y-expansion wafer scale signal, a reticle magnification signal, and a reticle rotation signal. Generally, errors associated with the reticle magnification signal and the reticle rotation signal relate to one particular exposure process on the surface of the wafer being processed in the exposure tool. One of the primary features taught by the present invention is a method of updating control input signals on the line 120 in response to an analysis of external variables.

When a process step in the processing tool 110 is concluded, the semiconductor wafer that is being processed in the processing tool 110 is examined in a review station. One such review station is a KLA review station. One set of data derived from the operation of the review station is a quantitative measure of the amount of misregistration that was caused by the previous exposure process. In one embodiment, the amount of misregistration relates to the misalignment in the process that occurred between two layers of a semiconductor wafer. In one embodiment, the amount of misregistration that occurred can be attributed to the control inputs to a particular exposure process. The control inputs generally affect the accuracy of the process steps performed by the exposure tools on the semiconductor wafer. The control input signals affect the reticle magnification and the position of the semiconductor wafer that is being processed. Modifications of the control inputs can be utilized to improve the performance of the process steps employed in the exposure tool. In one embodiment, the modifications to the control input signals on the line 120 are based on the effects of external variables on the semiconductor devices being processed.

Figure 2:
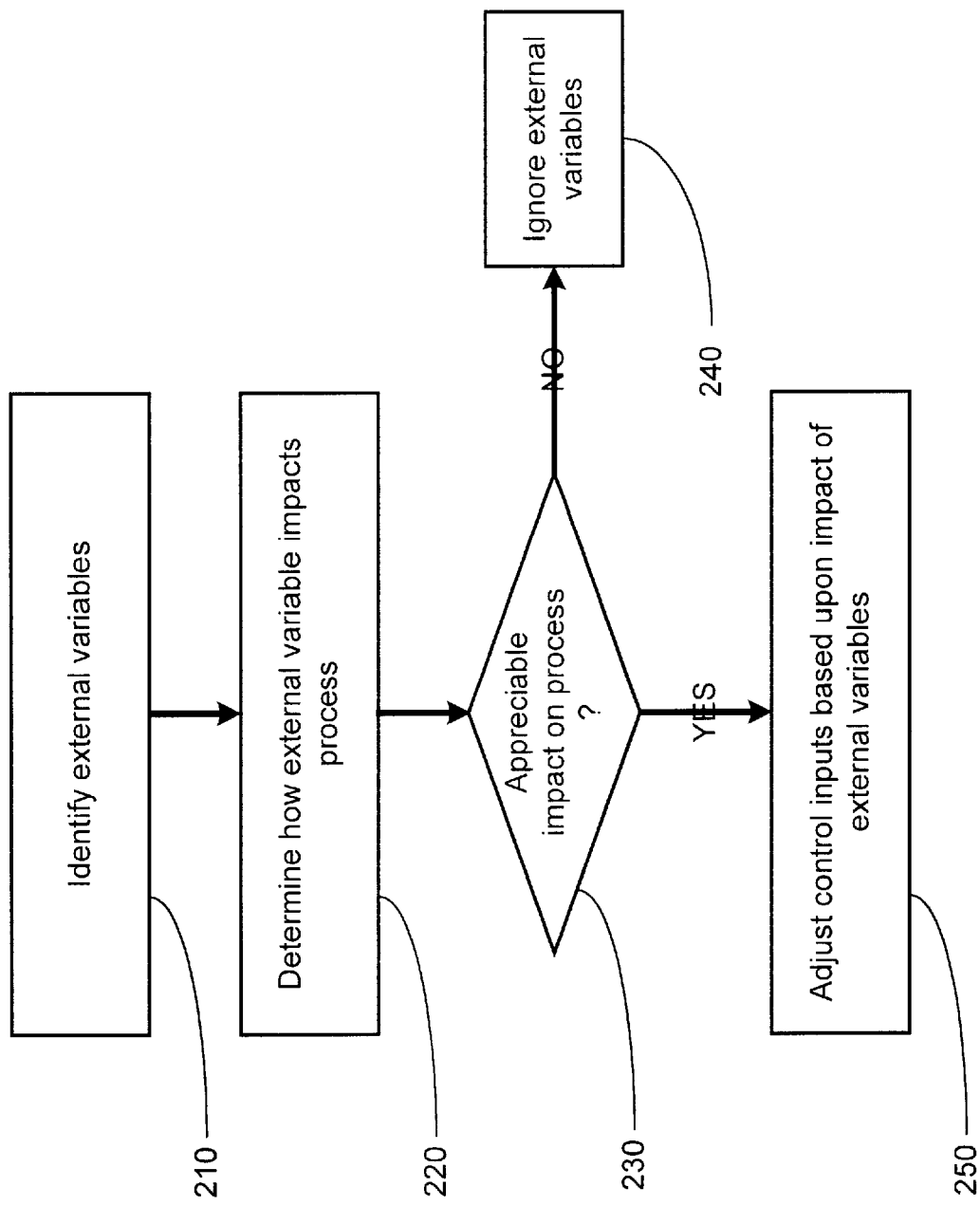
FIG. 2 illustrates a flowchart representation of the methods taught by the present invention.

One method of adjusting a manufacturing model based on machine disturbances, such as external variables, for run-to-run control of manufacturing of semiconductor devices is illustrated in FIG. 2. Turning now to FIG. 2, initially, external variables that could possibly affect semiconductor devices being processed are identified, as described in block 210 of FIG. 2. External variables, or machine disturbances, include variables such as temperature during processing, pressure, relative humidity, period of time between process steps, and differences in semiconductor product types. External variables can significantly affect process performance. In one embodiment, adjustments to semiconductor device manufacturing processes can be performed through existing process control systems, such as an Advanced Process Controller (APC). In one embodiment, modifications to control parameters on the line 120 can be made using a feedback arrangement that is integrated with an existing process control system that controls the manufacturing process.

Figure 3:
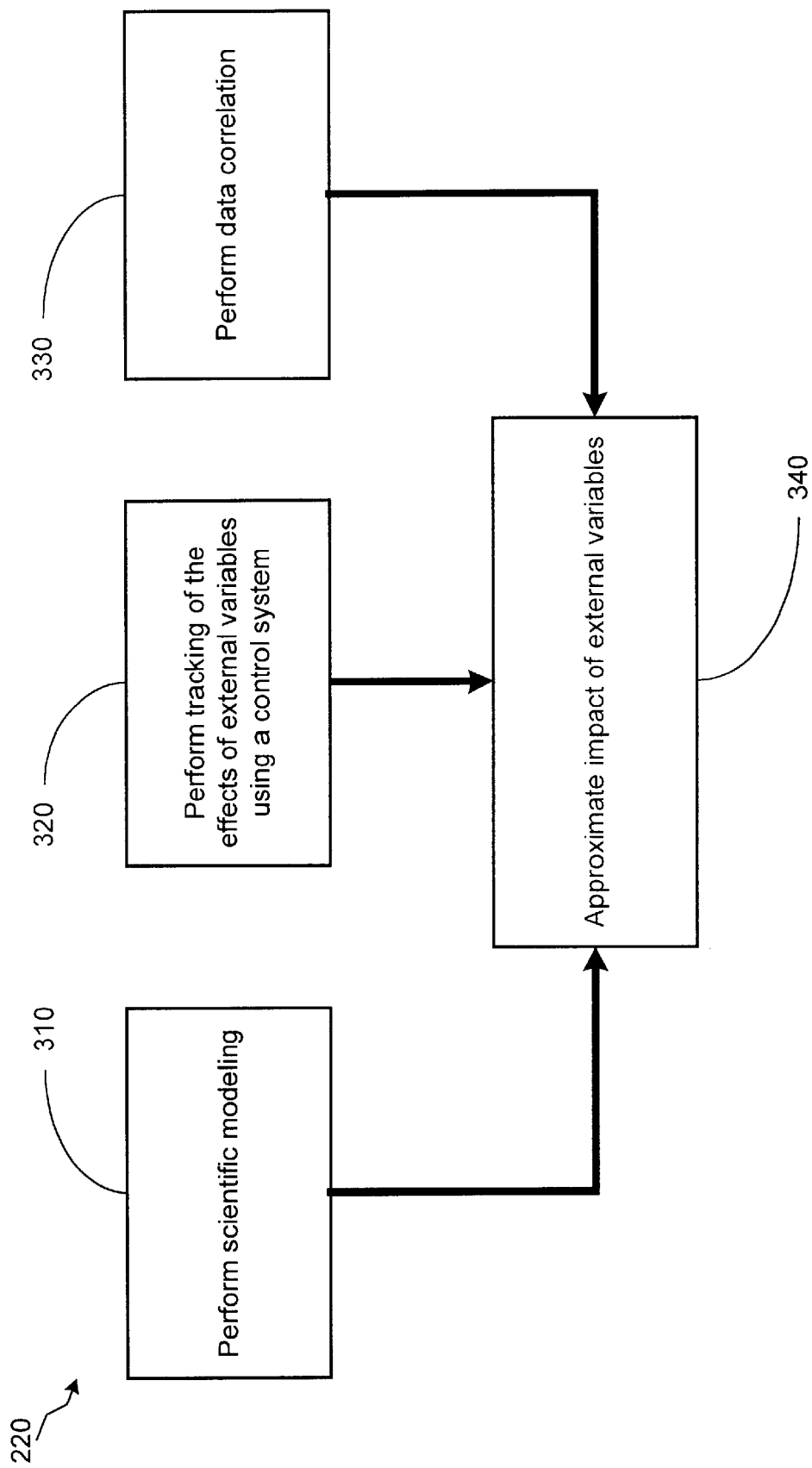
FIG. 3 depicts a more detailed illustration of the step of identifying external variables, which is described in block 210 of FIG. 2.

Once external variables that can affect semiconductor devices being processed are generally identified, a determination is made regarding how such external variables can affect process performance, as described in block 220 of FIG. 2. Turning now to FIG. 3, three methods of determining the impact of external variables are illustrated. One method of evaluating external variables is by implementing scientific modeling to study the possible effects of external variables upon semiconductor device processing, as described in block 310 of FIG. 3. Scientific modeling includes creating a behavior model for a process and adding effects of machine disturbances, or external variables, into the behavior model. Scientific modeling includes creating mathematical equations to approximate effects of variables. One mathematical equation that approximates behavior of at least a portion of a process is illustrated in Equation 1.

$$Xi+1=Ax_i+By_i+\text{Error} \qquad \text{Equation 1}$$

Referring to Equation 1, process behavior is approximated by Equation 1, which includes effects of an error factor that can occur during production of semiconductor devices.

$$Xi+1=Ax_i+By_i+d_i+\text{Error} \qquad \text{Equation 2}$$

Equation 2 includes the error factor and an additional term ($d_i$), which approximates a factor that accounts for disturbances, or external factors, that can affect processing of semiconductor devices. Scientific modeling can be implemented by those skilled in the art having benefit of the disclosure of the present invention. Using scientific modeling, the approximate impact of external factors can be determined, as illustrated in FIG. 3.

Another method of approximating the impact of external variables is to perform tracking of the effects of external variables on individual semiconductor devices being processed using a process control system, as described in block 320 of FIG. 3. Process control systems, such as the APC, can track each semiconductor device as it is being processed and record external variables, such as temperature, pressure, and time lags between process steps. The process control system can then develop an association between external variables and semiconductor devices being processed and approximate a relationship between process behavior and external variables. One skilled in the art having the benefit of the disclosure of the present invention can utilize a process control system to approximate the impact of external variables.

Figure 4:
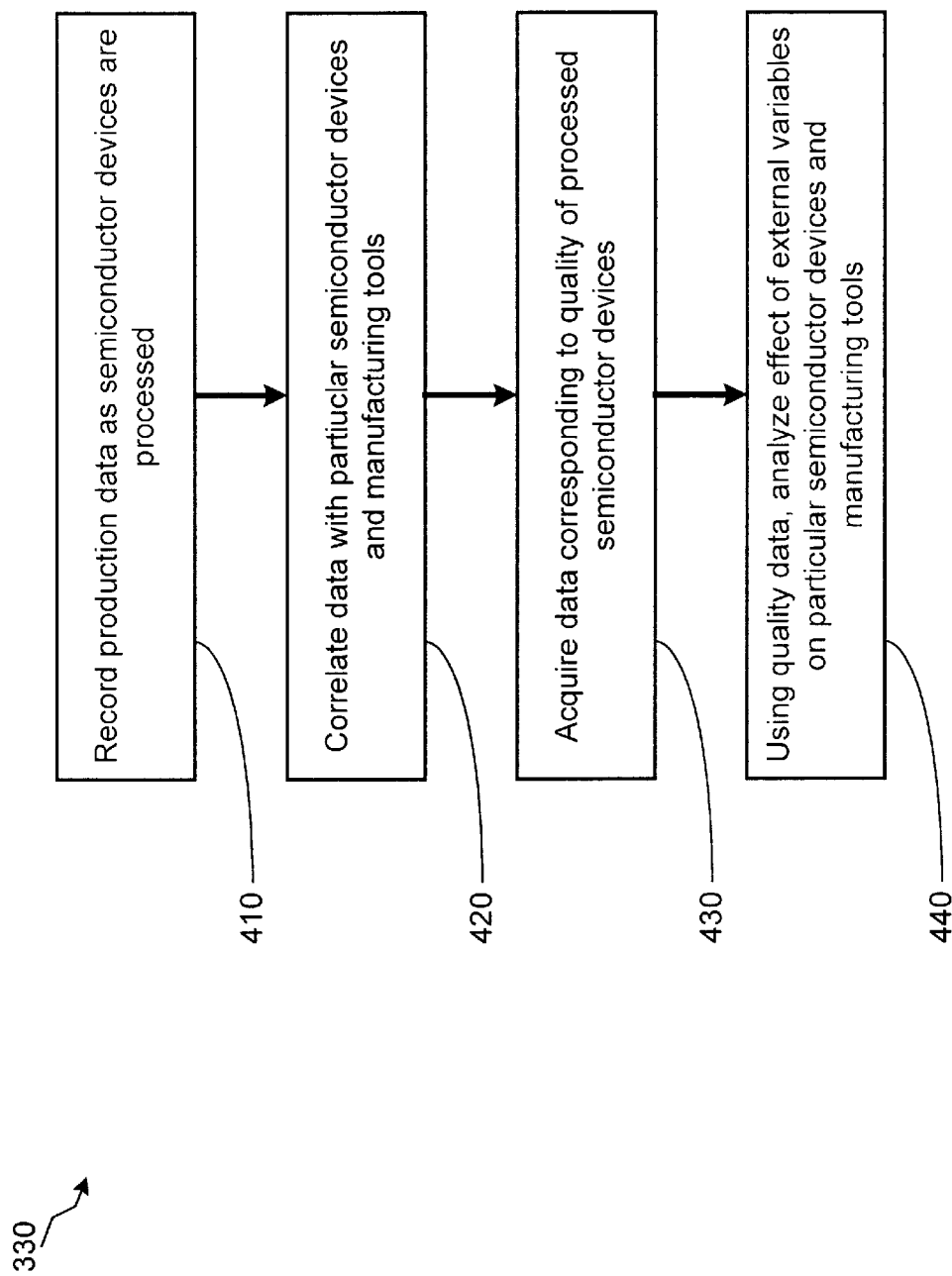
FIG. 4 depicts a more detailed illustration of the step of determining how external variables impact semiconductor manufacturing processes, which is described in block 220 of FIG. 2.

Another method of approximating the impact of external factors is to perform data correlation, as described in block 330 of FIG. 3. One embodiment of performing data correlation that is described in block 330 is illustrated in FIG. 4. Turning now to FIG. 4, the first step of data correlation is to record production data as semiconductor devices are processed, as described in block 410. A process controller (not shown), such as the Advanced Process Controller (APC), can be used to record production data. In one embodiment, the production data is stored in an electronic medium such that a process controller interface, such as an APC machine interface (not shown), is capable of recovering and sorting the production data. For photolithography overlay processes, data, such as misregistration between different layers of the semiconductor device, is recorded.

The production data is then correlated with particular semiconductor devices and particular manufacturing tools, as described in block 420 of FIG. 4. Data relating to quality of processed semiconductor devices can be extracted from the production data. A process controller, such as the APC, can access data relating to processed semiconductor devices and data that identifies the manufacturing tool in which they were processed. From the correlated production data, data corresponding to the quality of the processed semiconductor devices is acquired, as described in block 430 of FIG. 4. In other words, a process controller analyzes the production data and determines the quality level of the processed semiconductor devices and identifies the manufacturing tool in which the semiconductor devices were processed.

Once the quality level data of the processed semiconductor devices is acquired, using the quality data, the effects of external variables on particular semiconductor devices and manufacturing tools are analyzed, as described in block 440 of FIG. 4. In one embodiment, a computer software program can be used to correlate the quality data relating to processed semiconductor devices to particular external variables. For example, using the analysis described above, a correlation between high temperature and misregistration errors in photolithography overlay processes may be found. Other process variations can be correlated with a variety of external variables, such as temperature, relative humidity, and time lag between processes. The error analysis described above can be used to improve processing of semiconductor devices.

Turning back to FIG. 2. once an analysis is performed regarding how external variables affect semiconductor device processing, a determination is made whether a particular external variable that was analyzed makes an appreciable contribution towards any variation in a processing step of semiconductor devices, as described in block 230. Some external variables may make a significant impact on process output. One method of determining whether an external variable has an appreciable impact on processing of semiconductor devices is illustrated in FIG. 5.

Figure 5:
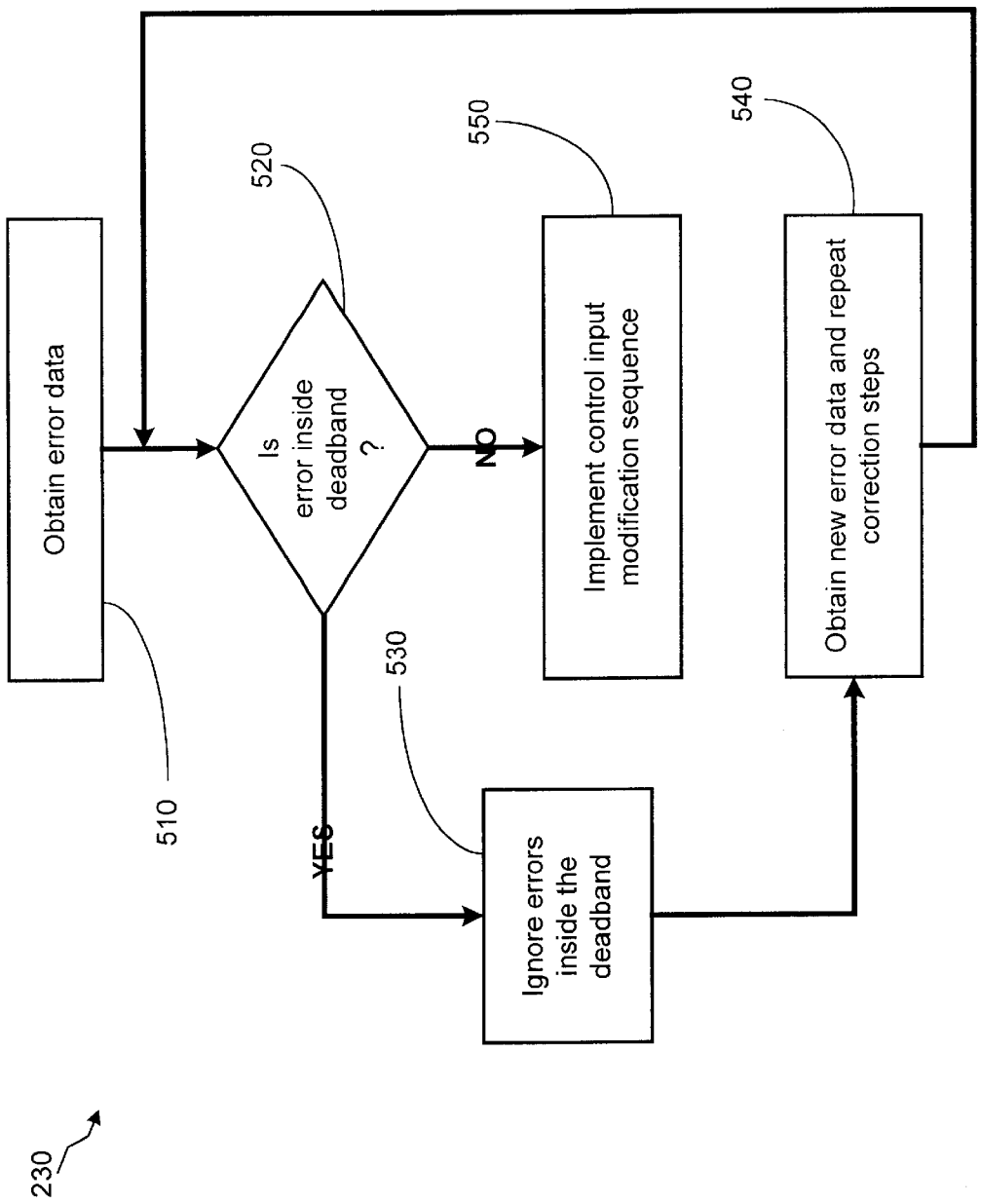
FIG. 5 depicts one method of determining whether external variables have an appreciable impact upon semiconductor device manufacturing processes.

Turning now to FIG. 5, error data relating to processing of semiconductor devices is acquired, as described in block 5 10. Once the error data is acquired, a determination is made whether the error data is inside the deadband, as described in block 520 of FIG. 5. The step described in block 520 is performed to determine whether an error is sufficiently significant to warrant a change in the control inputs on the line 120. To define the deadband, the errors acquired from product analysis stations (not shown), such as the review station, are compared to a predetermined set of threshold parameters. In one embodiment, the deadband contains a range of error values associated with control input signals centered proximate to a set of corresponding predetermined target values, for which generally controller action is blocked. If any one of the errors acquired from the product analysis station is smaller than its corresponding predetermined threshold value, that particular error is deemed to be in the deadband. One of the primary purposes of the deadband is to prevent excessive control actions, resulting from changes to control input signals on the line 120, from causing a semiconductor manufacturing process to be inordinately jittery.

When a determination is made, as shown in block 520, that an error corresponding to a control input signal is inside the deadband, that particular error is ignored, as described in block 530 of FIG. 5. Therefore, when the value of an error that corresponds to a control input signal is found to be in the predetermined deadband, that particular error is not used to update its corresponding control input signal. New error data is then obtained and analyzed, as described in block 540 of FIG. 5. In one embodiment, the steps described above are repeated for the new error data that is obtained.

When a determination is made, as shown in block 520, that an error corresponding to a control input signal is not inside the deadband, further processing, such as implementing a control input modification sequence, is performed, as described in block 550 of FIG. 5. The value of the error corresponding to a control input signal is used to update that control input signal for a subsequent manufacturing process step.

Turning back to FIG. 2, when a determination is made that external variables have not caused an appreciable impact upon the semiconductor device process, the external variables are generally ignored, as described in block 240 of FIG. 2. When a determination is made that external variables have caused an appreciable impact upon the semiconductor device process, control inputs on the line 120 are adjusted based upon the impact of the external variables, as described in block 250 of FIG. 2. One method of updating control signals to reduce the effects of external variables is illustrated in block 610 of FIG. 6.

Figure 6:
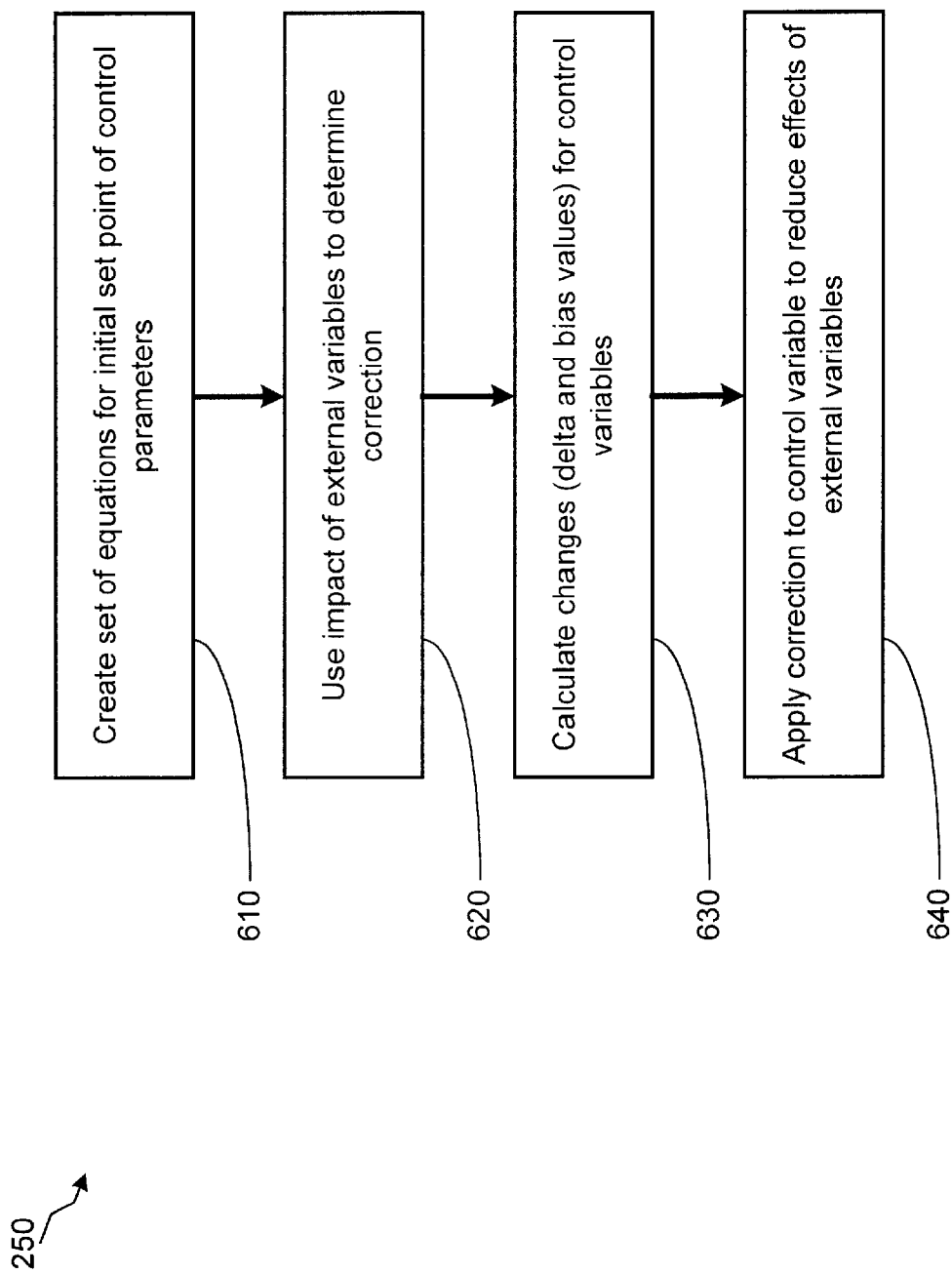
FIG. 6 illustrates in further detail one embodiment of adjusting control inputs, which is described in block 250 of FIG. 2.

Turning now to FIG. 6, a set of equations are created for developing an initial set point for input parameters on the line 120, as described in block 610. The equations that are generated to develop settings of input parameters are used to develop manufacturing models, and generally vary with different processes. Those skilled in the art having the benefit of the present disclosure are capable of creating equations to develop manufacturing models to control manufacturing of semiconductor devices. The impact of external variables, which is described above, upon processing is used to determine correction of control input signals, as described in block 620 of FIG. 6.

In one embodiment, changes for control input parameters on the line 120 are made by changing bias values and creating a delta in the control input signals, as described in block 630 of FIG. 6. Once the amount of change required is calculated, control input signals on the line 120 are updated, as described in block 640 of FIG. 6. Generally, the increment changes made to control input signals on the line 120 are equal to or smaller than a predetermined maximum step size (or maximum allowable step) for a particular control parameter. The changes made include modifications to control inputs such as the x-translation signal, the y-translation signal, the x-expansion wafer scale signal, the y-expansion wafer scale signal, the reticle magnification signal, and the reticle rotation signal. In one embodiment, increment changes to such control input signals can compensate for the impact of external variables and reduce their effect on semiconductor device manufacturing processes. Changes to control input signals can be made by those skilled in the art having the benefit of the present disclosure.

In one embodiment, control threads are utilized to control manufacturing processes. One method of using the updated control input signals on the line 120 is implemented by control threads. Control threads can be implemented by an overlay controller. Control threads add a good deal of complexity to the overlay control strategy. Control threads are a significant part of the control scheme of a semiconductor manufacturing tool, such as the exposure tool. Each of the different control threads acts like a separate controller, and is differentiated by various process conditions. For overlay control, the control threads are separated by a combination of different conditions, including the semiconductor manufacturing tool (e.g., stepper) currently processing the wafer lot, the semiconductor product, the semiconductor manufacturing operation, and the semiconductor manufacturing tool that processes the semiconductor wafer lot at a previous layer of the wafer. Modifications to control threads are performed using the principles taught by the present invention.

The principles taught by the present invention can be implemented in an Advanced Process Control (APC) framework. The APC is a preferred platform from which to implement the overlay control strategy taught by the present invention. In some embodiments, the APC can be a factory-wide software system; therefore, the control strategies taught by the present invention can be applied to virtually any of the semiconductor manufacturing tools on the factory floor. The APC framework also allows for remote access and monitoring of the process performance. Furthermore, by utilizing the APC framework, data storage can be more convenient, more flexible, and less expensive than local drives. The APC platform allows for more sophisticated types of control because it provides a significant amount of flexibility in writing the necessary software code.

Deployment of the control strategy taught by the present invention onto the APC framework could require a number of software components. In addition to components within the APC framework, a computer script is written for each of the semiconductor manufacturing tools involved in the control system. When a semiconductor manufacturing tool in the control system is started in the semiconductor manufacturing fab, it generally calls upon a script to initiate the action that is required by the process controller, such as the overlay controller. The control methods are generally defined and performed in these scripts. The development of these scripts can comprise a significant portion of the development of a control system. The principles taught by the present invention can be implemented into other types of manufacturing frameworks.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for correction of machine disturbances for control of semiconductor device manufacturing processes, comprising:

identifying at least one external variable;

determining an impact of said external variable on a semiconductor device manufacturing process, determining said impact of said external variable comprising employing a behavioral model for modeling an effect of said external variable, employing an equation for calculating an impact of said external variable, and correlating effects of said external variable to a specific semiconductor device to determine an impact of said external variable;

determining whether said impact of said external variable causes an appreciable impact on said semiconductor device manufacturing process; and adjusting at least one control parameter of said semiconductor device manufacturing process in response to said determination that said impact of said external variable causes an appreciable impact on said semiconductor device manufacturing process.

2. The method described in claim 1, wherein identifying at least one external variable further comprises identifying a temperature variable.

3. The method described in claim 1, wherein identifying at least one external variable further comprises identifying a relative humidity variable.

4. The method described in claim 1, wherein identifying at least one external variable further comprises identifying a period of time lag between manufacturing processes.

5. The method described in claim 1, wherein determining how said external variable impacts a semiconductor device manufacturing process further comprises performing scientific modeling.

6. The method described in claim 1, wherein determining how said external variable impacts a semiconductor device manufacturing process further comprises tracking effects of said external variable using a process control system.

7. The method described in claim 6, wherein tracking effects of said external variable using a process control system further comprises tracking effects of said external variable using an advanced process controller (APC).

8. The method described in claim 1, wherein determining how said external variable impacts a semiconductor device manufacturing process further comprises performing data correlation.

9. The method described in claim 1, wherein performing data correlation further comprises:
   recording production data relating to said semiconductor device being processed;
   correlating said recorded production data with specific semiconductor devices;
   correlating said recorded production data with specific manufacturing tools;
   acquiring data relating to quality of said processed semiconductor devices using said production data correlated with specific semiconductor devices and data correlated with specific manufacturing tools; and
   analyzing effect of said external variable on particular semiconductor devices and manufacturing tools using said data relating to quality.

10. The method described in claim 9, wherein processing semiconductor devices further comprises processing semiconductor wafers.

11. The method described in claim 10, wherein processing semiconductor wafers further comprises processing semiconductor wafers using an exposure tool.

12. The method described in claim 11, wherein processing semiconductor wafers using said exposure tool further comprises using an advanced process control framework.

13. The method described in claim 9, wherein recording production data relating to said semiconductor device being processed further comprises storing said production data into an electronic media such that a process controller is capable of retrieving said production data.

14. The method described in claim 1, wherein adjusting at least one control parameter of said semiconductor device manufacturing process further comprises modifying an x-translation signal, a y-translation signal, an x-expansion wafer scale signal, a y-expansion wafer scale signal, a reticle magnification signal, and a reticle rotation signal.

15. An apparatus for correction of machine disturbances for control of semiconductor device manufacturing processes, comprising:
   means for identifying at least one external variable;
   means for determining how said external variable impacts a semiconductor device manufacturing process, determining said impact of said external variable comprising employing a behavioral model for modeling an effect of said external variable, employing an equation for calculating an impact of said external variable, and correlating effects of said external variable to a specific semiconductor device to determine an impact of said external variable;
   means for determining whether said impact of said external variable causes an appreciable impact on said semiconductor device manufacturing process; and
   means for adjusting at least one control parameter of said semiconductor device manufacturing process in response to said determination that said impact of said external variable causes an appreciable impact on said semiconductor device manufacturing process.

16. A computer readable program storage device encoded with instructions that, when executed by a computer, performs a method for correction of machine disturbances for control of semiconductor device manufacturing processes, comprising:
   identifying at least one external variable;
   determining how said external variable impacts a semiconductor device manufacturing process, determining said impact of said external variable comprising employing a behavioral model for modeling an effect of said external variable, employing an equation for calculating an impact of said external variable, and correlating effects of said external variable to a specific semiconductor device to determine an impact of said external variable;
   determining whether said impact of said external variable causes an appreciable impact on said semiconductor device manufacturing process; and
   adjusting at least one control parameter of said semiconductor device manufacturing process in response to said determination that said impact of said external variable causes an appreciable impact on said semiconductor device manufacturing process.

17. The computer readable program storage device encoded with instructions that, when executed by a computer, performs the method described in claim 16, wherein identifying at least one external variable further comprises identifying a temperature variable.

18. The computer readable program storage device encoded with instructions that, when executed by a computer, performs the method described in claim 16, wherein identifying at least one external variable further comprises identifying a relative humidity variable.

19. The computer readable program storage device encoded with instructions that, when executed by a computer, performs the method described in claim 16, wherein identifying at least one external variable further comprises identifying a period of time lag between manufacturing processes.

20. The computer readable program storage device encoded with instructions that, when executed by a computer, performs the method described in claim 16, wherein determining how said external variable impacts a semiconductor device manufacturing process further comprises performing scientific modeling.

21. The computer readable program storage device encoded with instructions that, when executed by a computer, performs the method described in claim 16, wherein determining how said external variable impacts a semiconductor device manufacturing process further comprises tracking effects of said external variable using a process control system.

22. The computer readable program storage device encoded with instructions that, when executed by a computer, performs the method described in claim 21, wherein tracking effects of said external variable using a process control system further comprises tracking effects of said external variable using an advanced process controller (APC).

23. The computer readable program storage device encoded with instructions that, when executed by a computer, performs the method described in claim 16, wherein determining how said external variable impacts a semiconductor device manufacturing process further comprises performing data correlation.

24. The computer readable program storage device encoded with instructions that, when executed by a computer, performs the method described in claim 16, wherein performing data correlation further comprises:
   recording production data relating to said semiconductor device being processed;
   correlating said recorded production data with specific semiconductor devices;

correlating said recorded production data with specific manufacturing tools;

acquiring data relating to a quality of said processed semiconductor devices using said production data correlated with specific semiconductor devices and data correlated with specific manufacturing tools; and analyzing effect of said external variable on particular semiconductor devices and manufacturing tools using said data relating to quality.

25. The computer readable program storage device encoded with instructions that, when executed by a computer, performs the method described in claim 24, wherein processing semiconductor devices further comprises processing semiconductor wafers.

26. The computer readable program storage device encoded with instructions that, when executed by a computer, performs the method described in claim 25, wherein processing semiconductor wafers further comprises processing semiconductor wafers using an exposure tool.

27. The computer readable program storage device encoded with instructions that, when executed by a computer, performs the method described in claim 26, wherein processing semiconductor wafers using said exposure tool further comprises using an advanced process control framework.

28. The computer readable program storage device encoded with instructions that, when executed by a computer, performs the method described in claim 24, wherein recording production data relating to said semiconductor device being processed further comprises storing said production data into an electronic media such that a process controller is capable of retrieving said production data.

29. The computer readable program storage device encoded with instructions that, when executed by a computer, performs the method described in claim 16, wherein adjusting at least one control parameter of said semiconductor device manufacturing process further comprises modifying an x-translation signal, a y-translation signal, an x-expansion wafer scale signal, a y-expansion wafer scale signal, a reticle magnification signal, and a reticle rotation signal.

* * * * *

UNITED STATES PATENT AND TRADEMARK OFFICE
CERTIFICATE OF CORRECTION

PATENT NO. : 6,577,914 B1
DATED : June 10, 2003
INVENTOR(S) : Christopher A. Bode It is certified that error appears in the above-identified patent and that said Letters Patent is hereby corrected as shown below:

Column 2,
Line 4, replace "part," with -- part --.

Column 6,
Line 9, replace "FIG. 2." with -- FIG. 2, --.

Column 7,
Line 47, replace "water" with -- wafer --.

Signed and Sealed this

Twenty-first Day of October, 2003

JAMES E. ROGAN
*Director of the United States Patent and Trademark Office*